United States Patent [19]

Hendrick et al.

[11] 4,030,011

[45] June 14, 1977

[54] MULTIMODE CONTROL SYSTEMS

[75] Inventors: Russell C. Hendrick; John C. Larson, both of Minneapolis, Minn.

[73] Assignee: Honeywell Inc., Minneapolis, Minn.

[22] Filed: Mar. 24, 1975

[21] Appl. No.: 561,381

[52] U.S. Cl. .............................. 318/561; 318/580; 244/177

[51] Int. Cl.² ......................................... G05B 13/00

[58] Field of Search .......... 318/561, 580, 584, 585, 318/586, 590; 244/177, 178, 179, 180, 181

[56] References Cited

UNITED STATES PATENTS

| | | | |
|---|---|---|---|
| 3,184,662 | 5/1965 | Wallace | 318/618 |
| 3,446,946 | 5/1969 | Andeen | 318/561 X |
| 3,660,744 | 5/1972 | Plummer | 318/618 X |
| 3,793,574 | 2/1974 | Hamel | 318/561 |

*Primary Examiner*—B. Dobeck

[57] ABSTRACT

A control system exhibiting more than one system response characteristic depending on input signal parameters, and without requiring discrete switching of system components, is disclosed. At least one system input signal of varying frequency and amplitude is supplied to both high pass and low pass filters, the output of one of which is amplitude limited and additively combined with the output of the other filter to form a first intermediate control signal which is subtractively combined with the input signal to form a second intermediate control signal. The first and second intermediate control signals are passed through signal transfer elements having different signal transfer characteristics, and then combined to provide multimode response.

14 Claims, 2 Drawing Figures

4,030,011

MULTIMODE CONTROL SYSTEMS

BACKGROUND OF THE INVENTION

The invention herein described was made in the course of or under a contract, or subcontract thereunder, with the Department of the Air Force.

The invention pertains generally to electronic control system circuits, and more specifically to control systems which self-selectively exhibit more than one system response characteristic without utilizing discrete switching of control system components.

Electronic control systems typically employ system components selected for a particular response to one or more signal parameters. The components may respond to any of a variety of signal parameters, such as amplitude and/or frequency. In many systems, components are assumed to provide responses which are generally related to selected input signal parameters by constants of proportionality. Nonlinear component responses may also be provided in systems for which different response characteristics are desired depending on the magnitude of the selected signal parameter(s).

In certain control system applications, it is desirable or required that the system have substantially different responses in distinct operating modes. Advanced aircraft flight control systems are exemplary of systems wherein distinct responses to a set of input signals are desirable, depending on predominant aircraft mission. For example, on some missions it is preferrable to enhance control of aircraft flight path, perhaps at the expense of aircraft attitude, whereas on other missions it is preferrable to enhance control of aircraft attitude, perhaps at the expense of flight path. In both cases, the control system receives the same set input signals. For a given aircraft configuration and control surface, these signals may be indicative of control stick force, normal acceleration and pitch rate. Although the same set of input signals is used, different emphases must be placed on individual input signals depending on the aircraft mission.

It has been found that the optimum flight path mode of operation is characterized by high frequency, large amplitude inputs. For optimum aircraft flight path control, the elevator control system for a typical aircraft should respond rapidly to control stick and normal acceleration inputs, with less response to input signals indicative of aircraft attitude. The precision attitude mode is characterized by low frequency or small amplitude, high frequency inputs. For optimum aircraft attitude control, the elevator control system should respond primarily to pitch rate and control stick signals.

A common prior art approach to achieving a plurality of distinct operating modes in an aircraft control system has been to utilize pilot actuated discrete switching elements to change the input sensor configuration by removing or adding signals from selected sources. Pilot actuated switching has also been used for effectively changing control system components, thereby providing for distinct operating modes. Such systems are disclosed in U.S. Pat. Nos. 3,470,430 and 3,801,049 respectively issued to J. R. Younkin and R. D. Simpson et al.

Systems utilizing discrete switching are entirely satisfactory for many aircraft control system applications. However, such systems are subject to several significant disadvantages. Discrete switching involves the potential problem of disruptive switching transients which, at best, are undesirable in aircraft control systems. Systems in which mode changes are accomplished by pilot actuated switching arrangements also require additional pilot attention and effort to determine when operation should be switched from one mode to another, and for actuating the switching devices. This may be a significant burden in missions, such as air-to-air gunnery operations, where short target tracking intervals are interspersed with large changes in flight path.

It is also known to at least partially control discrete switches in a multimode control system by means of internal logic circuitry. Such a system is shown in U.S. Pat. No. 3,510,092 issued to R. C. Hendrick et al. Switching transients remain a potential problem in this system. Fader circuits are provided to insure a smooth transition between control modes.

Other prior art control systems have employed a variety of kinds of filters, limiters, etc. to achieve a range of aircraft control system responses depending on variations or rates of variation of selected system input signals. Such systems are disclosed in U.S. Pat. Nos. 3,659,173, 3,686,626 and 3,773,281 respectively issued to G. H. Pfersch, C. D. Bateman et al. and J. Doniger et al. The range of operational response and/or the versatility provided by these systems may not, however, be sufficient for certain more demanding control system applications.

The multimode control system of the applicants' invention overcomes the noted problems by providing a plurality of distinct operating modes characterized by substantially different response characteristics. Switchless transfer between control modes is achieved by means of a special arrangement of unique system subcircuits which respond to selected input signal parameters in providing a smooth transition between modes.

SUMMARY OF THE INVENTION

The applicants' multimode control system basically comprises at least one input source which supplies a signal of varying frequency and amplitude both to a summing junction and to a unique filter circuit which blocks a portion of the signal having certain parameter characteristics. The output of the filter circuit comprises a first intermediate control signal which is subtractively combined with the input signal to provide a second intermediate control signal. The first and second intermediate control signals are supplied to signal transfer elements having different transfer characteristics, and then combined. The resultant final control signal provides for a plurality of distinct system response modes depending on the input signal parameters.

The unique filter circuit has two parallel signal paths, one of which includes a high pass filter, and the other of which includes a low pass filter. One of the signal paths also includes an amplitude limiter in series with the filter. The outputs of the two signal paths are additively combined to form the first intermediate control signal. A complete control system may include a plurality of similar filter circuits, each receiving signals from separate input sources, and interconnected to provide a plurality of distinct operating modes.

Accordingly, it is a primary object of this invention to provide a multimode control system wherein transfer between control modes is automatically accomplished without discrete switching.

It is a further object of this invention to provide a unique frequency and amplitude sensitive filter circuit.

A further object is to provide a unique control system capable of transmitting a portion of an input signal of varying frequency and amplitude, excluding only high frequency, large amplitude components.

Yet a further object is to provide a unique multimode aircraft control system in which system response characteristics are automatically varied in accordance with selected input signal parameters.

Additional objects of the present invention may be ascertained from a study of the disclosure, drawings and appended claims.

DESCRIPTION OF THE PREFERRED EMBODIMENT

Figure 1:
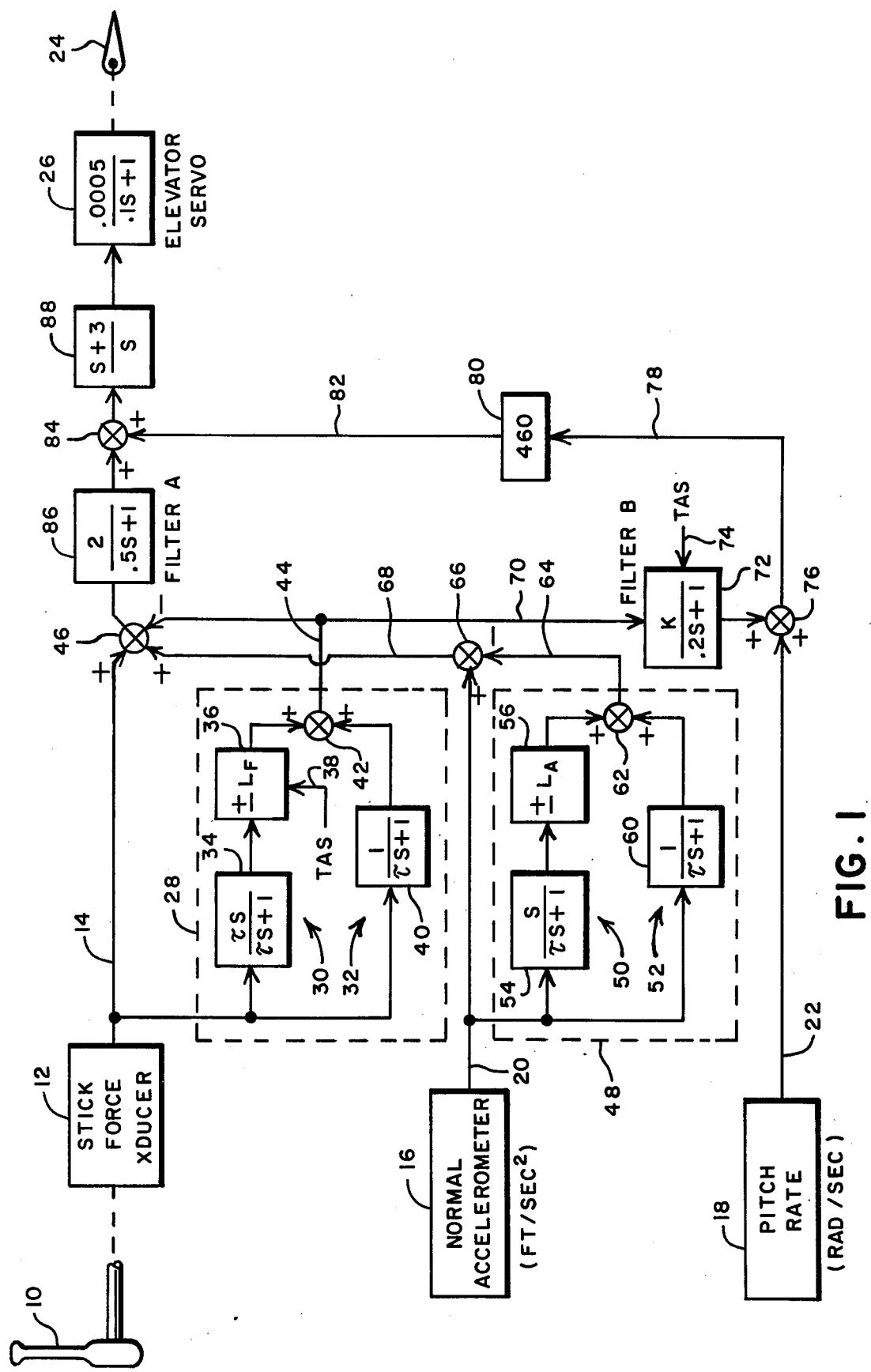
FIG. 1 is a block diagram of a multimode aircraft control system in accordance with the applicants' invention.

FIG. 1 functionally illustrates a control system in accordance with the applicants' invention configured for controlling the elevator of an aircraft having a conventional three axis set of control surfaces (i.e., an elevator, aileron/spoilers and a rudder). As to the pitch or yaw axis in such a system, one control surface affects two degrees of freedom. For example, the elevator affects normal acceleration and pitch angular rate.

In the block diagram of FIG. 1, reference numeral 10 identifies an aircraft control stick or wheel used by a pilot to control physical conditions such as elevator position. Stick 10 is mechanically connected to a stick force transducer 12 which converts force exerted on the stick into a corresponding electrical signal on conductor 14. In the system under consideration, elevator position affects conditions including normal acceleration and pitch rate which are respectively sensed by a normal accelerometer 16 and a pitch rate sensor 18.

Accelerometer 16 and sensor 18 supply electrical signals corresponding to normal acceleration and pitch rate on conductors 20 and 22 respectively. The signals on conductors 14, 20 and 22 are processed and combined by nonlinear signal processing circuitry which will hereinafter be described to appropriately control the position of an elevator control surface 24 actuated by an elevator servo system 26. The dynamic characteristics of a servo system preferred for this application are set forth in the block representation. Such servo systems are well known in the field of aircraft control systems. Similarly, the remaining blocks in FIG. 1 represent well known prior art elements having dynamic characteristics as mathematically indicated.

The stick force signal produced by transducer 12 is supplied to a special amplitude dependent filter circuit 28. The signal produced by transducer 12 is of varying frequency and amplitude depending on the pilot's control stick input. The frequency and amplitude characteristics typically differ depending on the aircraft mission at the time in question. For example, if flight path is of primary concern, the stick force signal is likely to be characterized by high frequency, large amplitude components. Such stick input signals ultimately result in normal acceleration also having high frequency, large amplitude components. Conversely, if precision attitude control is of primary concern, the stick force signal is typically characterized by high frequency, small amplitude or low frequency components. Likewise, the normal acceleration signal will be characterized by similar components.

Filter circuit 28 includes two parallel signal paths 30 and 32. As shown, signal path 30 comprises a high pass filter 34 in series with an amplitude limiter 36. Limiter 36 is shown as having a variable limiting level which is scheduled in accordance with true airspeed through an input 38. Although true airspeed is used as the scheduling condition, it should be noted that other environmental conditions may be more suitable in other control system configurations. Signal path 32 comprises a low pass filter 40. The output signals of limiter 36 and low pass filter 40 are additively combined at a summing junction 42 which produces the output signal of filter circuit 28, otherwise designated the first intermediate control signal, on a conductor 44.

The stick force signal on connector 14 and the first intermediate control signal on conductor 44 are subtractively combined at a summing junction 46 to form a a second intermediate control signal. Summing junction 46 also serves to combine the processed stick force signal and a processed normal acceleration signal as will hereinafter be described.

The normal acceleration signal on conductor 20 is supplied to a filter circuit 48 which is basically similar to filter circuit 28. Filter circuit 48 includes parallel signal paths 50 and 52. Signal path 50 comprises a high pass circuit 54 in series with an amplitude limiter 56. Signal path 52 comprises a low pass filter 60. The output signals of amplitude limiter 56 and low pass filter 60 are additively combined at a summing junction 62 which produces the output signal of filter circuit 48 on a conductor 64. The principal difference between filter circuits 28 and 48 is that the limiting amplitude of amplitude limiter 56 in filter circuit 48 is not scheduled in accordance with the true airspeed. Reference may be made to the description of filter circuit 28 for a further understanding of filter circuit 48.

The normal acceleration signal on conductor 20 and the output signal of filter circuit 48 on conductor 64 are subtractively combined at a summing junction 66. Summing junction 66 produces the processed normal acceleration signal which is supplied to summing junction 46 as shown on a conductor 68.

The first intermediate control signal on conductor 44 is supplied on a conductor 70 to a conventional filter 72. Filter 72 is shown as being scheduled in accordance with true airspeed as indicated at 74. The output signal of filter 72 is additively combined with the pitch rate signal on conductor 22 at a summing junction 76. Summing junction 76 provides a resultant signal on a conductor 78 which is amplified by means of a gain device 80, and transmitted over a conductor 82 to a summing junction 84. Summing junction 84 also receives the output signal of summing junction 46 as filtered by means of a conventional filter 86. The output signal of summing junction 84 is shaped by means of a shaping circuit 88 and transmitted to servo system 26 as the servo system control signal.

Figure 2:
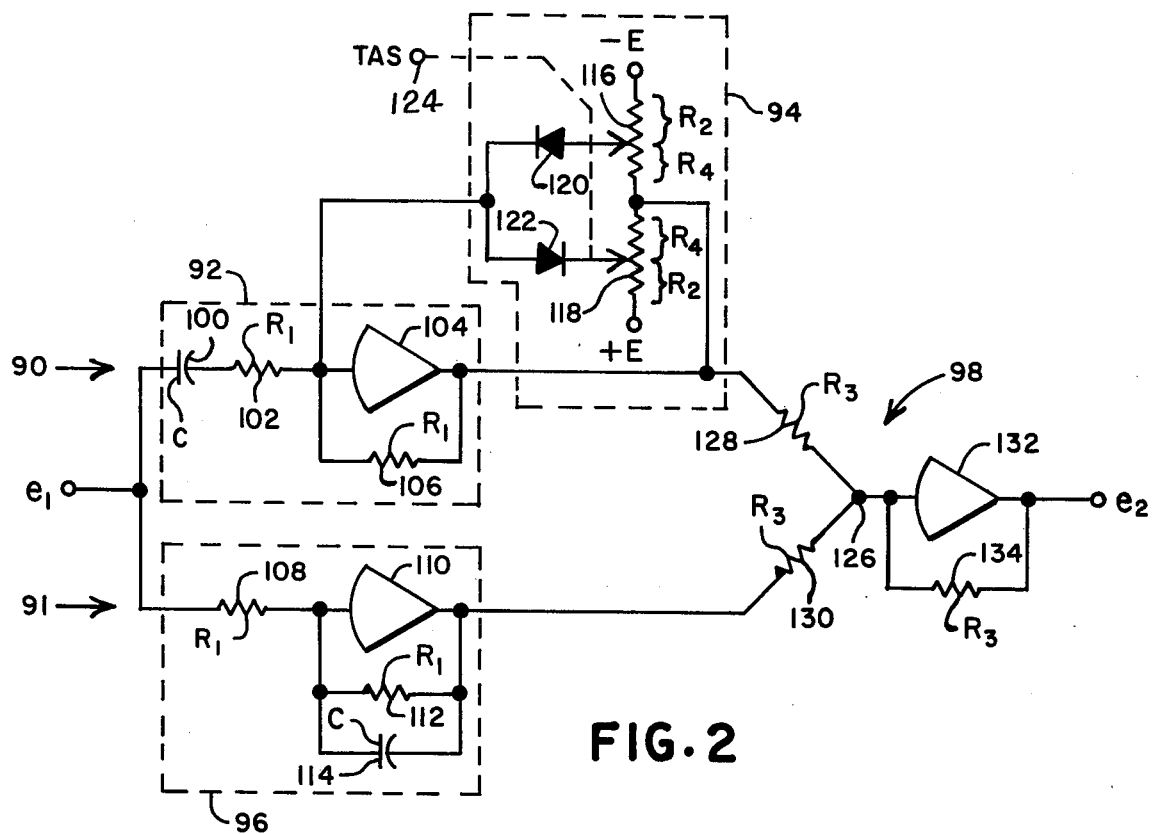
FIG. 2 is a circuit diagram of a unique frequency and amplitude sensitive filter circuit used in the multimode control system of FIG. 1.

The preferred circuit implementation for filter circuits 28 and 48 is shown in FIG. 2. The input signal is supplied through an input terminal labelled $e_1$ which is connected to two parallel signal paths generally identified by reference numerals 90 and 91. Signal path 90 comprises a high pass filter 92 in series with an amplitude limiter 94. Signal path 91 comprises a low pass filter 96. The output signals of amplitude limiter 94 and low pass filter 96 are additively combined at a summing junction generally identified by reference numeral 98 which supplies the filter circuit output signal on an output terminal labelled $e_2$.

High pass circuit 90 is of a well known configuration, comprising a capacitor 100 and a resistor 102 connected in series to the input of a conventional high gain operational amplifier 104. A feedback resistor 106 is connected around amplifier 104. Similarly, low pass circuit 96 comprises a resistor 108 connecting input terminal $e_1$ to the input of an operational amplifier 110. A resistor 112 and a capacitor 114 are shown connected in parallel around amplifier 110. Each of the resistors in high pass filter 92 and low pass filter 96 is shown having resistance $R_1$. Each of the capacitors in these filters is shown having capacitance C.

High pass circuit 92 functions to pass only input signal frequency components above a lower frequency limit established by the values of capacitor 100 and resistor 102. Similarly, low pass filter 96 functions to pass only input signal frequency components below an upper frequency limit established by the values of resistor 112 and capacitor 114.

Amplitude limiter 94 comprises a pair of potentiometers 116 and 118. The resistance elements of the potentiometers are connected in series between negative and positive reference voltage sources labelled —E and +E. The wiper of potentiometer 116 is connected to the anode of a diode 120. The wiper of potentiometer 118 is connected to the cathode of diode 122. The cathode of diode 120 and the anode of diode 122 are connected to the input of amplifier 104. The junction between the resistance elements of potentiometers 116 and 118 is connected to the output of amplifier 104.

The positions of the wipers of potentiometers 116 and 118 are shown coordinatley controlled in accordance with the true airspeed through an input 124. The portions of the resistance elements between the wipers and voltage sources —E and +E respectively each having resistance $R_2$. The portions of the resistance elements between the wipers and the junction of the resistance elements each have resistance $R_4$.

The outputs of amplitude limiter 94 and low pass filter 96 are connected to a junction point 126 through resistors 128 and 130 respectively. Junction point 126 is connected to output terminal $e_2$ through an amplifier 132 having a feedback resistor 134. Resistors 128, 130 and 134 are shown as having resistances $R_3$.

Amplitude limiter 94 functions to block signal components of positive or negative polarity having amplitudes greater than limits established by the magnitudes of reference voltage E and resistances $R_2$ and $R_4$. Specifically, the limiting value is given by the expression $R_4E/(R_2+R_4)$ where the value of $R_4$ is assumed to be much smaller than the value of $R_1$. The action of diodes 120 and 122, as biased with the input signal to amplifier 104 and the voltages on the wipers of potentiometers 116 and 118 serves to suppress input signal components having amplitudes in excess of the limiting amplitude. An amplitude limiter circuit of this type is further described on pages 460 and 461 of a text entitled *Control System Analysis and Synthesis.*

Operation of the multimode control system of FIG. 1 is closely tied to operation of the applicants' unique frequency and amplitude sensitive filter circuit. With reference to FIG. 2, high pass filter 92 and low pass filter 96 have constants chosen so that all components of any signal expected to be supplied to input terminal $e_1$ are passed by one or the other of the filters with approximately unity gain. The signal components passed by low pass filter 96 are transmitted through summing junction 98 and amplifier 132, and appear at output terminal $e_2$ in the same form such components appeared at input terminal $e_1$.

The signal components passed by high pass filter 92 are limited by amplitude limiter 94 prior to transmission through summing junction 98 and amplifier 132. Thus, only high frequency signal components of less than a predetermined amplitude are supplied to summing junction 98. The signal appearing at output terminal $e_2$ is similar in form to the signal supplied to input terminal $e_1$ except that the output signal does not contain high frequency components of greater than the predetermined amplitude. Stated differently, the filter circuit of FIG. 2 passes low frequency signals and high frequency, small amplitude signals.

The filter circuit of FIG. 2 is advantageously used as follows to implement the multimode control system of FIG. 1. In the precision attitude mode of operation, which is characterized by small amplitude input signals, the control stick and normal acceleration signals are blocked from reaching filter 86. Small amplitude input signals, thus, result in output signals from filter circuits 28 and 48 which are identical to the input signals supplied thereto. The input and output signals of filter circuits 28 and 48 are respectively subtractively combined at summing junctions 46 and 66. Accordingly, the output signals of the summing junctions are net zero signals.

In the precision attitude mode, the total control stick signal is, however, passed through filter circuit 28 and filter 72 to summing junction 76 where it is summed with the pitch rate signal. Filter 72 is scheduled in accordance with true airspeed to produce a gradient characteristic identical to the pitch rate signal. The combined control stick and pitch rate signals are modified by gain device 80 and supplied through shaping circuit 88 to elevator servo system 26. The constants of filter 72 are selected so that the control system provides rapid yet well damped (low overshoot) pitch rate response to control stick inputs. The normal acceleration signal has no effect on operation in the precision attitude mode.

The flight path mode is characterized by significant high frequency, large amplitude input signal components. Since the high frequency, large amplitude control stick and normal acceleration signal components are not passed by filter circuits 28 and 48, these components are not blocked at summing junctions 46 and 66. The high frequency, large amplitude control stick and normal acceleration signal components are, thus, combined and passed through filter 86 to provide a control input to the elevator actuator system. Amplitude limiter 36 is scheduled with true airspeed to produce a signal characteristic corresponding to a preset normal acceleration perturbation level. Scheduling the limiting level as described provides for characterizing the control stick signal in accordance with the normal acceleration signal resulting from control stick inputs. The constants for filter 86 are chosen to provide rapid yet well damped normal acceleration response to control stick inputs. The output of filter 86 is combined with the output of gain device 80 to produce the control input to the elevator actuator system. The effects of pitch rate inputs are subordinated to the effects of normal acceleration inputs in the flight path mode.

In accordance with the foregoing description, the control system of FIG. 1 provides a plurality of distinctly characterized control modes without requiring discrete switching for transfering from one mode to another. Although the disclosed embodiment of the applicants' multimode control system pertains to aircraft flight control systems, the novel features of the system, including the unique frequency and amplitude sensitive filter circuit are useful in ther control system applications. Other embodiments which do depart from the applicants' contemplation and teaching will be apparent to those skilled in the art. The applicants do not intend that coverage be limited to the disclosed embodiment, but only by the terms of the appended claims.

What is claimed is:

1. In a multimode control system including means for affecting physical condition in response to an input signal which is processed through nonlinear signal processing circuitry to provide more than one system response characteristic depending on input signal frequency and amplitude, the improvement which comprises:
   a high pass filter;
   a low pass filter;
   means for supplying the input signal to said high pass and low pass filters;
   an amplitude limiter;
   means for supplying the output signal of one of said high pass and low pass filters to said amplitude limiter;
   first summing means for additively combining the output signals of said amplitude limiter and the other said high pass and low pass filters;
   second summing means for subtractively combining the input signal and the output signal of said first summing means;
   first signal transfer means having a first signal response characteristic;
   means for supplying the output signal of said first summing means to said first signal transfer means;
   second signal transfer means having a second signal response characteristic distinct from the first signal response characteristic;
   means for supplying the output signal of said second summing means to said second signal transfer means;
   third summing means for combining the output signals of said first and second signal transfer means; and
   means for supplying the output signal of said third summing means to the condition affecting means.

2. The multimode control system of claim 1 wherein:
   the output signal of said high pass filter is supplied to said amplitude limiter; and
   the output signals of said amplitude limiter and said low pass filter are additively combined.

3. The multimode control system of claim 2 wherein said amplitude limiter has a variable limiting level.

4. The multimode control system of claim 3 wherein the variable limiting level of said amplitude limiter is scheduled in accordance with an environmental condition.

5. The multimode control system of claim 2 wherein the signal response characteristic of at least one of said first and second signal transfer means is scheduled in accordance with an environmental condition.

6. A signal filter element comprising:
   a high pass filter;
   a low pass filter;
   means for supplying an input signal to said high pass and low pass filters;
   an amplitude limiter;
   means for supplying the output signal of one of said high pass and low pass filters to said amplitude limiter; and
   summing means connected to sum the output signals of said amplitude limiter and the other of said high pass and low pass filters.

7. The signal filter element of claim 6 wherein the output signal of said high pass filter is supplied to said amplitude limiter.

8. The signal filter element of claim 7 wherein the limiting level of said amplitude limiter is variable.

9. An aircraft control system comprising:
   an input device for producing a first signal indicative of a desired position of a control surface;
   a rate sensor for producing a second signal indicative of the rate of change of a condition affected by the control surface;
   a first amplitude dependent filter circuit;
   means for supplying the first signal to said first amplitude dependent filter circuit;
   first summing means for subtractively combining the first signal and the output signal of said first amplitude dependent filter circuit to produce a third signal;
   first signal transfer means having a first signal response characteristic;
   means for supplying the third signal to said first signal transfer means;
   second signal transfer means having a second signal transfer characteristic distinct from the first signal transfer characteristic;
   means for supplying the output signal of said first amplitude dependent filter circuit to said second signal transfer means;
   second summing means for additively combining the second signal and the output signal of said second signal transfer means to produce a fourth signal; and
   third summing means for additively combining the fourth signal and the output signal of said first signal transfer means to produce a signal for positioning the control surface.

10. The aircraft control system of claim 9 wherein the signal response characteristic of said second signal transfer means is scheduled in accordance with true airspeed relative the the aircraft.

11. The aircraft control system of claim 9 wherein said first amplitude dependent filter circuit comprises:
   a low pass filter;
   a high pass filter;
   means for supplying the first signal to said low pass and high pass filters;
   a signal amplitude limiter;
   means for supplying the output signal of said high pass filter to said signal amplitude limiter; and
   a summing junction for summing the output signals of said low pass circuit and said signal amplitude limiter.

12. The aircraft control system of claim 11 wherein the limiting level of said signal amplitude limiter is scheduled in accordance with true airspeed relative to the aircraft.

13. The aircraft control system of claim 9 further including:
- an acceleration sensor for providing a fifth signal indicative of an acceleration affected by the control surface;
- a second amplitude dependent filter circuit;
- means for supplying the fifth signal to said second amplitude dependent filter circuit;
- fourth summing means for subtractively combining the fifth signal and the output signal of said second amplitude dependent filter circuit to produce a sixth signal; and
- means for supplying the sixth signal to said first summing means.

14. The aircraft control system of claim 13 wherein each of said first and second amplitude dependent filter circuits comprises:
- a high pass filter;
- a low pass filter;
- means for supplying an input signal to said high pass and said low pass filters;
- a signal amplitude limiter;
- means for supplying the output signal of said high pass filter to said signal amplitude limiter; and
- a summing junction for summing the output signals of said low pass circuit and said signal amplitude limiter.

* * * * *